United States Patent
McIntosh

(10) Patent No.: US 6,738,724 B2
(45) Date of Patent: May 18, 2004

(54) TWO-STAGE MULTIWAVELENGTH THERMAL RADIATION ANALYZER

(76) Inventor: Devon R. McIntosh, 17609 Clinton Dr., Accokeek, MD (US) 20607

( * ) Notice: Subject to any disclaimer, the term of this patent is extended or adjusted under 35 U.S.C. 154(b) by 0 days.

(21) Appl. No.: 10/162,408

(22) Filed: Jun. 4, 2002

(65) Prior Publication Data

US 2003/0225543 A1 Dec. 4, 2003

(51) Int. Cl.⁷ .................................................. G01J 5/00
(52) U.S. Cl. ........................ 702/134; 374/121; 374/127
(58) Field of Search ........................... 702/134; 356/43, 356/45; 374/120, 121, 126, 127, 124

(56) References Cited

U.S. PATENT DOCUMENTS

| | | | |
|---|---|---|---|
| 5,132,922 A | 7/1992 | Khan | 364/557 |
| 5,772,323 A | 6/1998 | Felice | 374/127 |
| 6,379,038 B1 * | 4/2002 | Felice | 374/128 |

* cited by examiner

Primary Examiner—Kamini Shah

(57) ABSTRACT

The invention provides a passive two-stage multiwavelength approach for measuring temperature, emissivity and straylight levels. The first stage comprises the steps of, (1) acquiring spectral intensity measurements over a predetermined spectral width of a thermal radiation source radiating at a true effective spectral emissivity and with a true source temperature, (2) forming a composite function that relates said spectral intensity measurements to the true effective spectral emissivity and the true source temperature, (3) providing emissivity estimating means for approximately determining how the true effective emissivity affects the color temperature of the thermal radiation source, (4) substituting an estimated effective spectral emissivity for the true effective spectral emissivity within the composite function such that the estimated emissivity approximately accounts for the effects of the true effective emissivity on the color temperature, (5) substituting a source temperature projection for the true source temperature within the composite function, and (6) utilizing the composite function to provide a best-fit correlation between the spectral intensity measurements, the estimated emissivity, and the projected source temperature such that when the projected source temperature equals the true source temperature the composite function attains an extremum, thereby obtaining an approximation of said source temperature. The second stage comprises the steps of (1) utilizing spectral acquisition means to acquire and measure a set of multiple spectral intensity distributions of a thermal radiation source radiating at multiple source temperatures at an effective spectral emissivity, wherein each of the spectral intensity distributions is associated with a particular source temperature, and (2) forming a first function of at least two of the measured spectral intensity distributions and of a set of temperature variables that represent the temperatures of the spectral intensity distributions used, such that the first function attains an extremum when the temperature variables equal the corresponding source temperatures, thereby calculating the source temperatures.

14 Claims, 4 Drawing Sheets

TWO-STAGE MULTIWAVELENGTH THERMAL RADIATION ANALYZER

BACKGROUND OF THE INVENTION

1. Field of the Invention

This invention relates generally to thermal radiation analysis. More specifically this invention relates to radiometric determination of temperature, emissivity, and stray light.

2. General Background and Description of Related Art

Optical pyrometers are of three general types: brightness, ratio, or multiwavelength (i.e. MW). Brightness and ratio pyrometers require prior knowledge of surface emissivity and environmental interference. In addition to wavelength, emissivity, which is the ratio of the emitted radiation of a real radiator to that of an ideal one, can depend on composition, surface finish, and temperature. Environmental interference in the form of radiation absorption or scattering within the transmission medium can also be a problem.

Brightness devices rely on capturing a known fraction of the energy emitted by the target; the user must know the emissivity to get the correct temperature value. For many circumstances this may not be possible.

Ratio pyrometry attempts to circumvent the emissivity issue by utilizing the ratio of the intensities measured at two different wavelengths instead of the intensity magnitude. The resulting representative equation is solved for temperature with the assumption that the division has canceled out the emissivity. This method works if the emissivity is the same at both wavelengths, but this is only certain in an ideal or semi-ideal (gray-body) radiator. Concern over emissivity cancellation affects the design of ratio pyrometers: the closer together the wavelengths are chosen, the more likely the emissivities are to cancel, but the greater the degradation of actual performance. As a result, accurate temperature measurements with this approach is not possible in many instances. One way to minimize the errors is to average the results of many ratio pairs (Felice, U.S. Pat. No. 5,772,323); however, this approach cannot calculate accurate source temperatures for functional forms of the emissivity that systematically increase or decrease the color temperature.

Multiwavelength (MW) pyrometry was developed to simultaneously calculate the temperature and spectral emissivity of a thermal radiator from spectral intensity measurements made at several wavelengths. Originally, this involved assuming a specific parameterized wavelength dependence of the spectral emissivity, and utilizing spectral intensity measurement data to determine the adjustable parameters by solving simultaneous equations involving the Plank distribution for the parameters and the temperature. However, this method is highly sensitive to radiation intensity measurement errors and to differences between the actual and assumed emissivity functional forms, which increase the temperature calculation errors as the number of parameters increase.

A subsequent MW approach provides an improvement to the original approach by determining the temperature and emissivity parameters using best-fit least-squares fitting of numerous spectral intensity data points (Kahn, et al., U.S. Pat. No. 5,132,922). This reduces the sensitivity to measurement errors by removing the emphasis from an exact functional fitting of the experimental data. Instead, the regression fit utilizes the statistical averaging of a large data set to more accurately determine temperature. An additional improvement is to preprocess the measurement data to minimize the effects of noise and external influences before utilizing the curve fitting technique. However, even these improvements do not prevent significant errors for a variety of functional forms of the emissivity.

The main problems with current MW approaches include the following:

1. The assumed functional forms of the emissivity distribution may not adequately describe the wavelength dependence and lead to significant errors in the temperature computation.
2. Unaccounted for spectral components of reflected or transmitted stray light can severely limit measurement accuracy.
3. Measurements within media that absorb and radiate can significantly degrade calculations.

SUMMARY OF THE INVENTION

The invention provides new types of thermal radiation analysis and analyzers that determine temperature and can be used to determine spectral emissivity, the spectral distribution of extraneous radiation and atmospheric absorptivity as well. It comprises a two-stage, passive MW measurement approach, each stage of which is novel. Neither stage requires prior knowledge or independent assessment of the emissivity, and the final calculated temperature and emissivity are insensitive to the functional form of the emissivity. Stage-1 provides an emissivity compensating methodology that typically provides accuracies of less than 1%, and Stage-2 provides a multi-temperature simultaneous calculation that utilizes the results of Stage-1 to provide typical accuracies of less than 0.1 K.

For a thermal radiation source at temperature T, the following approximate relationship can be written for the measured spectral intensity $W(\lambda,T)$, and the emissivity $\epsilon(\lambda,T)$, $$Ln[W(\lambda,T)\lambda^5\alpha]-Ln[\epsilon(\lambda,T)]=-a_0/(\lambda T) \qquad (1)$$

$\alpha$ is a constant that depends on the solid angle of light intercepted ($\alpha=37415$, for $\lambda$ in units of microns and W in units of Watts/m$^2$, when all the radiated light is intercepted), $\lambda$ is the wavelength, Ln is the natural log, and $a_0$ is a constant equal to 14388 $\mu$mK ($\lambda$ in units of $\mu$m and T in units of K). The idea is provide a best fit of the right-hand-side (RHS) of Eqn. (1) to the left-hand-side (LHS) to determine T. Unfortunately, $\epsilon(\lambda,T)$ is generally unknown; however, the spectral variation of the emissivity term is much less than that of the spectral intensity term, and a rough estimate of the emissivity term is enough to provide a fairly accurate estimate of T. Initially, the emissivity term is assumed to be constant, and a spectral least squares best-fit of the RHS and the emissivity term to the intensity data in Eqn. (1) is used to determine T and the constant emissivity within various spectral sub-regions (approximately 10 contiguous sub-regions) of $W(\lambda,T)$ such that the LHS best fits the RHS, thereby determining if the color temperature is generally increasing, decreasing, or remaining constant with wavelength. Then, an emissivity of a predetermined functional form that yields a similar increase, decrease or constant color temperature is determined, and a new value for T is calculated using Eqn. (1). More explicitly, $Ln[\epsilon(\lambda,T)]$ can be written as, $$Ln[\epsilon(\lambda,T)]=x_0(T)+x_1(\lambda,T) \qquad (2)$$

The simplest approximation for $x_1$ is, $$x_1(\lambda,T) = s_x(T)(\lambda - \lambda_L) \quad (3)$$

$\lambda_L$ is the shortest wavelength of the measured spectrum. $s_x$ is determined by choosing the value that best reproduces the changes in color temperature observed. More explicitly, by inserting Eqn. (2) and Eqn. (3) into Eqn. (1) and solving for $s_x$ if there is an equal number of wavelengths in the different sub-regions, then for the $j^{th}$ wavelength in the $i^{th}$ subregion, the $i^{th}$ $s_x$ is given by, $$s_{xi} := \left[ \text{Ln}[(\lambda_{i+1,j})^5 \cdot W(\lambda_{i+1,j}, T) - (\lambda_{i,j})^5 \cdot W(\lambda_{i,j}, T)] + \frac{a_0}{(\lambda_{i+1,j}T_{i+1})} - \frac{a_0}{(\lambda_{i,j}T_i)} \right] \cdot (\lambda_{i+1,j} - \lambda_{i,j})^{-1} \quad (4)$$

$s_x$ is obtained by taking the average of $s_{xi}$. Eqn. (1) can now be rewritten as, $$\text{Ln}[W(\lambda,T)\lambda^5/\alpha] - s_x(T)(\lambda - \lambda_L) = x_0(T) - a_0/(\lambda T) \quad (5)$$

T and $x_0$ are determined by a least-squares best-fit of the RHS of Eqn. (5) to the LHS. This value of T is then used with Eqn. (1) to consistently determine the emissivity.

To minimize sensitivity to noise (from atmospheric absorptivity, electrical noise, etc.), standard signal preprocessing of the spectral intensity distribution measurements of time averaging and subtracting out background levels are performed at the beginning of this stage. Further preprocessing steps of discarding spectral regions having curvatures that are a factor of 10 or more greater than average, and discarding data from any of the spectral sub-regions yielding preliminary temperatures that are 10% or more different from neighboring sub-regions.

Two important differences between the Stage-1 method of the invention and the standard MW approach are that (1) a wide spectral range can be utilized with this approach to yield more accurate results with only a rough approximation of the emissivity, and (2) the spectral variation of the projected emissivity is determined independently of the temperature calculation.

The error in T can be estimated from the maximum change in the color temperature calculated from the various spectral sub-regions. The maximum and minimum temperatures obtained from this error estimate serve as input to Stage-2.

The Stage-2 temperature calculation is more accurate than that of Stage-1, but is computationally much more intensive, therefore, to ensure timely calculations, only a multiple of the temperature range obtained from the Stage-1 calculation is considered in Stage-2. The approach essentially compares at least two different spectral intensity distributions radiated at two different temperatures by the same source to obtain both temperatures. The different temperature spectra are acquired by imaging different surface areas of the source. It is important that the different spectral distributions be radiated with the same emissivity, and emissivity can be a function of temperature. But since its temperature dependence is much less than the temperature dependence of the intensity, and since the temperatures can be made arbitrarily close by imaging closely spaced surface regions of the source, the temperature dependence of the emissivity can be neglected.

First, spectral intensity measurements $W(\lambda,T)$ from at least two different temperature regions of the source are obtained. Correspondingly different projected emissivities $\epsilon'(\lambda,T,T')$ are then determined by dividing $W(\lambda,T)$ by the Plank blackbody intensity function evaluated at a projected source temperature T'. Since there is only one true spectral emissivity, which must be the same irrespective of the spectral intensity distribution used to calculate it, the correct two source temperatures are the two values of T' that cause the corresponding two projected emissivity distributions to be equal. These two values of T' can be determined by looking for the maximum correlation between the two normalized projected emissivities as a function of the projected temperatures. By definition, at these two values of T', the projected emissivities both equal the true emissivity.

More explicitly, the correlation function approach can be summarized by the following. For two temperatures, $T_a$ and $T_b$, the emissivity correlation function is defined as, $$<\epsilon_h(\lambda, T_a, T_{a'}), \quad (6)$$

$$\epsilon_h(\lambda, T_b, T_{b'}) > = \int_{\lambda_L}^{\lambda_U} \epsilon_h(\lambda, T_a, T_{a'}) \cdot \epsilon_h(\lambda, T_b, T_{b'}) d\lambda$$

where, $$\epsilon_h(\lambda, T, T') := \frac{\epsilon'(\lambda, T, T')}{\left( \int_{\lambda_L}^{\lambda_U} \epsilon'(\lambda, T, T')^2 d\lambda \right)^{.5}}$$

and, $$\epsilon'(\lambda, T, T') := \frac{W(\lambda, T)}{W_B(\lambda, T')}$$

$W_B$ is the Plank blackbody intensity distribution function, and $\epsilon_h$ is a normalized projected emissivity. The correlation between the two projected emissivities is determined by Eqn. (6), which attains a maximum value when $T_a' = T_a$ and $T_b' = T_b$. In addition, to facilitate the search for the maximum, $T_b$ can be written in terms of $T_a'$ as, $$T_{b'} := \frac{a_0}{\lambda} \cdot \left[ \ln\left[ \left( e^{\frac{a_0}{\lambda \cdot T_{a'}}} - 1 \right) \cdot \frac{W(\lambda, T_a)}{W(\lambda, T_b)} + 1 \right] \right]^{-1}$$

Stray-light contributions to the measured spectral intensity distribution that survived the initial preprocessing subtraction are conveniently determined and subtracted out within the calculation. A parameterized functional form of the residual stray-light contribution is subtracted from the measured spectral intensity distribution, and the difference is substituted for the measured distribution within the correlation function. For instance, if the main source of stray light are two incandescent bulbs operating at color temperatures of 2800 K and 3100 K, then the parameterized stray light function is, $C_1 W_B(\lambda, 2800K) + C_2 W_B(\lambda, 3100K)$, where $C_1$ and $C_2$ are the stray light parameters.

Then, in addition to finding the maximum correlation as a function of the projected source temperatures, the maximum is also determined as a function of the stray-light parameters. This maximum occurs when the values of the stray-light parameters accurately reflect reality. The result is accurate values for the source temperatures as well as for the stray light intensity distribution.

At this point, the emissivity determined from the Stage-1 or from the Stage-2 calculations is an effective spectral emissivity, which may be different from the true source spectral emissivity due to modification by atmospheric absorptivity via an extraneous multiplicative function. If the approximate spectral locations and relative magnitudes of the atmospheric absorption peaks are known and general material characteristics of the radiating source are known, parameterized functional forms for the source emissivity and for the atmospheric absorptivity (i.e. the extraneous function) can be assumed. The parameters are determined by equating the product of the two functional forms to the effective emissivity, and performing a best-fit calculation over the measured spectral range, thereby simultaneously computing the source spectral emissivity and the atmospheric absorption.

The measurement approach of the invention requires the near-simultaneous measurement of different intensity spectra, and is best accomplished with a multi-channel fiber-optic spectrophotometer with detector array configured with special optics, electronics, and computerized control (each channel is actually a separate spectrometer). Different surface areas and spectral regions of the radiation source are imaged onto the different spectrophotometer channels via computer-controlled auto-focus and auto zoom optical elements, and via waveguide cables. The auto-focus and auto-zoom allows simultaneous imaging of surface areas having a wide range of separation distances, which in turn yield the different temperature spectral intensity measurements required by the Stage-2 calculation. Additionally, the different spectral regions imaged provide a wide spectral coverage that enhances the accuracy of the Stage-1 and Stage-2 calculations. The preferred embodiment involves a total spectral width where the longest wavelength is greater than twice the shortest wavelength.

DETAILED DESCRIPTION OF THE INVENTION

Figure 1:
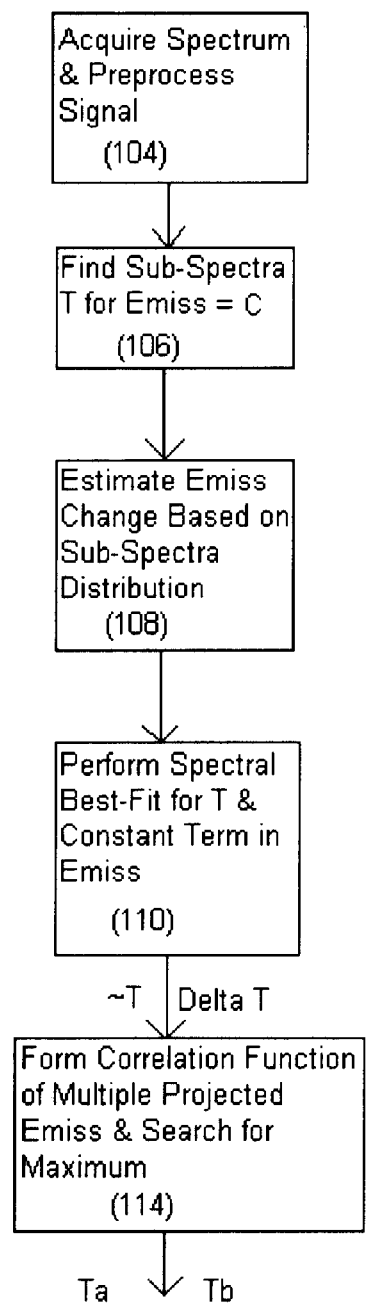
FIG. 1 diagrams the computational steps of the invention.

FIG. 1 shows the computational steps of a first computational embodiment of the invention. Spectral intensity distributions of the radiation source are measured at two different temperatures at discrete wavelengths and preprocessed in step 104. The preprocessing involves the usual time averaging and subtraction of the background spectrum as well as discarding segments of the distribution having curvatures greater than 10 times the average, or yielding preliminary temperatures that are 10% or more different from that of neighboring subsections. In step 106, the spectral emissivity in Eqn. (1) is taken as constant, and a best fit utilizing the equation is used to determine a preliminary value of T in 10 contiguous spectral sub-regions of equal spectral width that together span the entire measurement spectrum (which, for the preferred embodiment is from 450 nm to 1800 nm). The differences in T computed for the different sub-regions yields an estimate of the expected error $\Delta T$. Step 108 utilizes the functional form of the emissivity shown in Eqn. (2) and (3), and the preliminary values of T to obtain the slope $s_x$ via Eqn. (4). Then, in step 110, a best-fit analysis of the spectra intensity data utilizing Eqn. (5) produces a final Stage-1 value for T. This value and the estimated error are utilized in step 114, which is Stage-2, to limit the temperature range used in searching for the maximum of the two-temperature correlation function described in Eqn. (6). The two temperatures, $T_a$ and $T_b$, are found simultaneously as those at which the correlation function maximum occurs.

Figure 2:
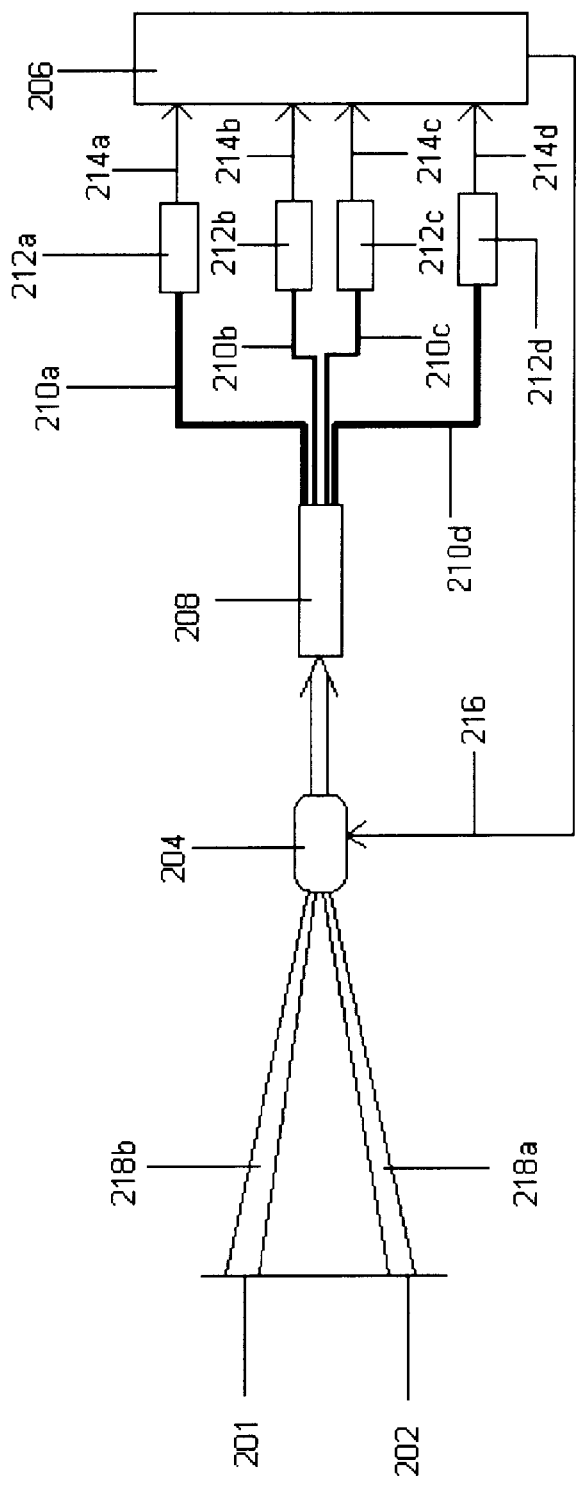
FIG. 2 diagrams a first functional layout of the invention.

FIG. 2 shows a first method of acquiring a broad, two-temperature spectrum. A thermal source with regions 201 at temperature $T_b$, and 202 at temperature $T_a$ generate thermal radiation 218b and 218a respectively, which are imaged by computer controlled focus and zoom optical component 204 via control signal 216 onto primary fiber optic cable 208. Auto-focusing and auto-zooming, controlled by the computer 206 (ultrasonic transducer for auto-focusing not shown) ensures the projection of the two different temperature zones 201 and 202 onto the lower and upper portions respectively of the optical cable (see FIG. 3) by attaining a sharply focused image of a size determined by the imaging area of optical cable 208. A wide range of temperature differences is possible by performing Stage-1 calculations of the temperatures of regions 210 and 202, and zooming out as appropriate to increase the temperature difference. Secondary optical cables 210a–210d transmit to spectrophotometer channels 212a–212d respectively. The spectrophotometers utilize a diffraction grating to disperse the light into spectral components, which are measured by a detector array with a wavelength resolution of about 5 nanometers. Spectrophotometer channels 212a and 212c measure the $T_a$ and $T_b$ generated spectra respectively within the 450 nm to 900 nm wavelength range, while channels 212b and 212d measure the $T_a$ and $T_b$ generated spectra respectively within the 900 nm to 1800 nm wavelength range (see FIG. 3). The spectral measurements are transmitted to computer 206 via cables 214a–214d, and used to calculate both Stage-1 and Stage-2 temperatures.

Figure 3:
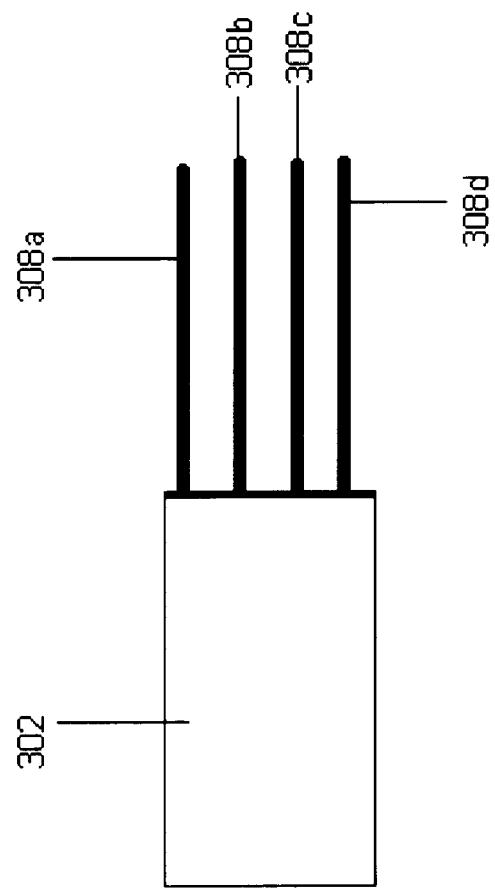
FIG. 3 shows side and front conceptual views of a primary optical cable of the invention.
Figure 3:
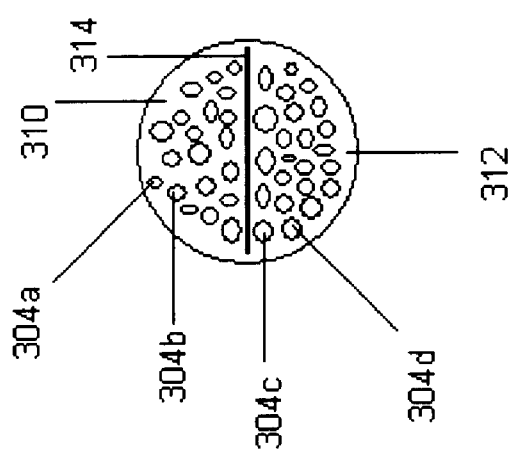

FIG. 3 shows the primary and secondary optical cables used in FIG. 2. The primary cable 302 is separated by conceptual dividing line 314 into lower-half 312 optical fibers that see thermal radiation 218b, and upper half 310 fibers that see thermal radiation 218a. Secondary cables 308a and 308b contain the upper-half fibers, and secondary cables 308c and 308d contain the lower-half fibers. The fibers comprising cables 308a and 308b are upper-half adjacent neighbors at the imaged end of the primary cable, such as the case for fibers 304a and 304b, and therefore see the same spectrum generated at the same temperature. They are used to transmit to spectrophotometer channels covering different spectral ranges, and correspond to cables 210a and 210b. Cables 308c and 308d contain the lower-half adjacent neighbor fibers such as fibers 304c and 304d. They transmit a different temperature spectrum to another set of two spectrophotometers, and correspond to cables 210c and 210d.

Figure 4:
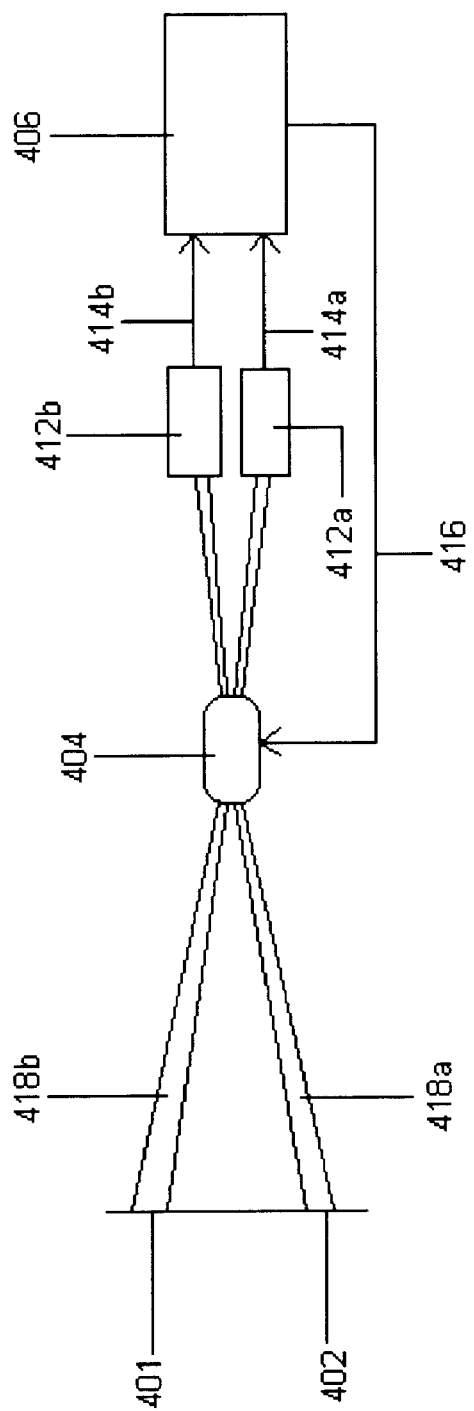
FIG. 4 is a functional diagram of a second structural embodiment of the invention.

FIG. 4 shows a second method of acquiring intensity spectra at multiple temperatures of the same source. Surface regions 401 and 402 of the source are at two different temperatures, and generate thermal radiation 418b and 418a, which are imaged by computer controlled focus (ultrasonic transducer not shown) and zoom optical component 404 onto spectrophotometer channels 412a and 412b respectively, which in turn, transmit the measured spectra to computer 406 via signals 414a and 414b respectively. The computer controls the zoom and focus of the optical component via signal 416 and ensures that regions of predetermined temperature differences are imaged onto the diffraction grating of the spectrophotometer channels. It also computes the Stage-1 and Stage-2 temperatures from an analysis of the measured spectra.

The Stage-1 computational structure is not limited to that described in FIG. 1. Any approach that determines an approximate emissivity, independent of the final temperature determination, by analyzing the measured spectrum, and subsequently utilizes this approximation to determine the source temperature and/or emissivity is contemplated by the invention. For instance, the full Plank function could have been used as opposed to the exponential approximation used in Eqn. (1), or the best-fit made to the intensity distribution instead of the natural log of the distribution. There are also different ways to estimate the emissivity. The linear approximation to its natural log made in Eqn. (2) yielded the approximation of Eqn. (4) and Eqn. (5), but other approximations such as the exponential, logarithmic, or power series functional forms could have been used. Other ways of compensating for the color temperature increasing or color temperature decreasing effect of the emissivity could also be used. For instance, instead of utilizing an approximate emissivity that roughly results in the observed spectral variation in the intensity distribution, a constant emissivity of one could be used if the radiation color temperature is being increased by the effective emissivity. This would cause a decrease in the best-fit temperature generated using Eqn. (1). The wide width of the sampled spectrum limits underestimation. Conversely, for an effective emissivity induced reduction in the color temperature, an estimated lower limit constant emissivity could provide the appropriate color temperature increase with minimum risk of over-inflation. There are also other means of estimating $\Delta T$. For instance $\Delta T$ could be determined as a function of the type of variation in the intensity distribution instead of the total variation in color temperature, or it could be determined as a function of the variation in emissivity. Other details such as the number and size of the sub-regions, and the preprocessing steps can clearly be modified.

Likewise, the Stage-2 computational structure is not limited to that described in the discussion of FIG. 1. Any approach that determines thermal radiation source temperatures or emissivity by comparing the spectral intensity distributions thermally radiated at multiple temperatures by the source is contemplated by the invention. For instance, another implementation would be to express the ratio of two spectra measured at different temperatures (i.e. $T_a$ and $T_b$) in terms of the Plank function to obtain an expression for the ratio in terms of the two temperatures as follows:

$$Ln[W(\lambda,T_a)/W(\lambda,T_b)] \approx -(a_0/\lambda)(1/T_a - 1/T_b) + \exp(-a_0/(\lambda T_a)) - \exp(-a_0/(\lambda T_b)) \quad (7)$$

$T_a$ and $T_b$ can now be determined by a best-fit of the LHS expression to the RHS data. Additionally, intensity distributions generated at more than two temperatures can be readily incorporated within the correlation function approach. For instance, the three-temperature correlation function is defined very similarly to Eqn. (6) except with an additional normalized projected emissivity within the brackets on the LHS, and within an additional integral on the RHS. Also, while a linear combination of $W_B(\lambda, T)$ was used for the stray-light functional form, any derived functional form that reflects the stray-light contribution could be used instead. It is also noted, that while it is best to utilize the Stage-1 outputs as Stage-2 inputs, if real-time temperature assessments are not required, this step could be omitted, or the output from another computation approach could be utilized.

The invention is not limited to the multi-temperature thermal radiation spectra acquisition and measurement methods discussed in FIGS. 2, 3 and 4. Any approach that acquires and measures thermal radiation spectra emitted by the same source at different temperatures, and utilize an analysis of the differences in the spectra to determine the source temperatures, is contemplated by the invention. For instance, the spectra generated at more than two temperatures or over more than two spectral regions can be readily acquired by utilizing more spectrophotometers similarly configured to those of FIG. 2 or FIG. 4. Actually, any other device capable of quantifying spectral intensities could be utilized in place of, or in conjunction with the spectrophotometers. These include single detector devices utilizing multiple wavelength filters, charge coupled devices, and charge injection devices. It is also possible to use more optical components similar to components 204 and 404 to image additional surface areas of the radiation source, thereby enhancing measurement robustness. Also the spectral measurements need not be strictly simultaneous. For instance, each spectrometer could be used to measure spectra radiated from multiple regions of the source by sequentially imaging the different regions via different zoom settings, and storing the spectra in computer memory for near-real time calculations. Additionally, instead of computer controlled zooming, optical cables connected to the optical inputs of the FIG. 4 spectrophotometers could be used to guide light into the spectrophotometer, and the other end of the fiber, which receives light from optical component 404, could be shifted back and forth to intercept emissions from the desired source regions. Also, in FIG. 3, the imaging surface of the primary optical cable could be subdivided into more than two subsections to facilitate the acquisition of spectra radiated at more than two temperatures.

It can thus be appreciated that the objectives of the present invention have been fully and effectively accomplished. The foregoing specific embodiments have been provided to illustrate the structural, functional, and computational principles of the present invention and is not intended to be limiting. To the contrary, the present invention is intended to encompass all modifications, alterations, and substitutions within the spirit and scope of the appended claims.

What is claimed is:

1. A thermal radiation analysis method comprising the steps of,
   a) utilizing spectral acquisition means to acquire and measure a set of multiple spectral intensity distributions of a thermal radiation source radiating at multiple source temperatures at an effective spectral emissivity, wherein each of the spectral intensity distributions is associated with a particular source temperature,
   b) forming a first function of at least two of the measured spectral intensity distributions and of a set of temperature variables that represent the temperatures of the spectral intensity distributions used, such that said first function attains an extremum when the temperature variables equal the corresponding source temperatures, thereby calculating said source temperatures.

2. The thermal radiation analysis method of claim 1, wherein said first function involves the ratio of two of the spectral intensity distributions.

3. The thermal radiation analysis method of claim 1, wherein said first function is the correlation function of at least two different normalized projections of said effective emissivity, where each of the normalized projections is calculated from one of the measured spectral intensity distributions.

4. The thermal radiation analysis method of claim 1, wherein the relative magnitudes of the measured spectral intensity distributions are used to express a first subset of said set of temperature variables in terms of a second subset of said set of temperature variables, thereby decreasing the number of unknown temperature variables in said first function.

5. The thermal radiation analysis method of claim 3, wherein the measured spectral intensity distributions include contributions from a stray light source, wherein the stray light contributions are determined and subtracted out by algebraically subtracting projected stray light spectral intensity distributions from said measured spectral intensity distributions, and varying the projected stray light distributions along with said temperature variables until said first function attains said extremum, at which point the projected stray light distributions equal the actual stray light contributions, and the temperature variables equal the corresponding source temperatures.

6. The thermal radiation analysis method of claim 1, wherein the spectral intensity distributions are acquired from different surface areas of said thermal radiation source, and wherein a computerized zoom lens guided by a computer calculation is used to automatically adjust the distance between the different surface areas imaged, whereby a predetermined range of temperature differences between the acquired spectral distributions is attained.

7. The thermal radiation analysis method of claim 1, further providing multiple spectrophotometers to acquire said set of multiple spectral intensity distribution.

8. The thermal radiation analysis method of claim 7, further providing a segmented optical cable and imaging means for imaging different surface areas of said radiation source onto different cable segments, wherein said optical cable contains optical fiber within predetermined cable segments, such that the source surface area imaged onto a particular segment is routed by a particular set of optical fibers to a particular set of spectrophotometers.

9. A thermal radiation analyzer comprising,
   a) an imaging device for projecting onto a number of spectral measurement devices, a number of thermal radiation spectral intensity distributions radiated by a thermal radiation source at a number of radiation source temperatures, wherein each of the intensity distributions is radiated from a different surface area of the radiation source, and only one intensity distribution is projected onto a particular spectral measurement device,
   b) a number of spectrophotometers that are said number of spectral measurement devices and that measure and output the intensity distributions,
   c) a computing device that calculates said radiation source temperatures by comparing the spectral differences in the intensity distributions outputted by the spectrophotometers.

10. The thermal radiation analyzer of claim 9, wherein said imaging device is a computer-controlled zoom lens, wherein said computing device utilizes said spectral differences in said spectral intensity distributions to determine the zoom factor, thereby determining the temperature differences between the imaged surface areas.

11. The thermal radiation analyzer of claim 10, further including auto-focusing of said imaging device.

12. The thermal radiation analyzer of claim 9, wherein optical cables are used to transmit the thermal radiation projected by said imaging device to the spectrophotometers.

13. The thermal radiation analyzer of claim 11, wherein said optical cables include a segmented cable arranged such that different intensity distributions are imaged onto different cable segments, and wherein optical fibers are arranged within predetermined cable segments, such that the surface area of a source imaged onto a particular segment is routed by a particular set of optical fibers to a particular set of spectrophotometers.

14. The thermal radiation analyzer of claim 11, including multiple imaging devices for projecting multiple intensity distributions onto multiple spectrophotometers.

* * * * *